United States Patent Office.

JAMES H. DILKS, OF NEW YORK, N. Y., ASSIGNOR TO C. T. RAYNOLDS AND COMPANY, OF THE SAME PLACE.

*Letters Patent No. 72,818, dated December 31, 1867.*

IMPROVED LUMP BLUE FOR USE IN LAUNDRIES AND IN BLEACHING.

*The Schedule referred to in these Letters Patent and making part of the same.*

TO ALL WHOM IT MAY CONCERN:

Be it known that I, JAMES H. DILKS, of the city, county, and State of New York, have invented a Lump Soluble Blue for Laundry and Bleaching Purposes; and I do hereby declare that the following is a description of my invention sufficient to enable those skilled in the art to practise it.

My invention consists in the manufacture of an entirely new article for laundry and bleaching purposes, namely, a lump soluble indigo or Prussian blue.

Heretofore, blues for such purposes have been made exclusively either in the powdered or in the liquid form. The disadvantages of both these forms are many, and apparent in every day's experience. In the powdered state, it is liable to great loss and waste in handling; to be injudiciously and carelessly used by the laundress; to be unequally distributed and dissolved in the water; to smut and smear everything with which it comes in contact, and to spot the clothes; and as ordinarily made with acids, it is also liable to damage the clothes, by eating into and gradually destroying the fabric. When blueing is put up in a liquid form, its strength and quality are generally not what could be desired, and by frequent uncorking and exposure, these are likely to be still further reduced. The danger and annoyance of broken bottles, caused by careless handling or by cold weather, and the damage to furniture, &c., caused by their being upset or broken, all tend to render this mode of preparation unpopular and expensive. Hence it has long been a great desideratum to overcome these disadvantages. But hitherto this has not been attained. By my new mode of manufacture, I avoid all the inconveniences and much of the expense incident to the powdered or liquid forms above mentioned.

I make my blueing in the lump form, whether composed of the same materials as the ordinary Prussian, Chinese, or Paris blue of commerce, or compounded in any other way, or of any other material.

The usual and most convenient manner in which I produce in the lump form ready for the market is as follows:

I take a soluble blue, as made in the various ways known to manufacturing-chemists, and instead of powdering it, I press the blue while damp into lumps or cakes of any desired form or size, and then dry them. When the blue is already in a powdered state, it should be reduced with water to a thick, pulpy condition, and then pressed and dried as above. Sizing may or may not be used in forming these lumps, according to the quality of the blue under treatment.

In this lump form it is found that the color comes off from the lump gradually, and enables the party using it to regulate the required strength or depth of color much better and with far greater nicety and precision than when in the powdered state.

In practical use, it is better to confine the lump within a stout flannel or other bag, which, when the bottom is moistened in the washing-water, will give out a clear, even tint. It is found by experience that this is the cleanest and by far the most economical mode in which blueing can be used.

I claim, as a new article of manufacture, a soluble blue in lumps, made substantially as above described.

JAMES H. DILKS.

Witnesses:
CHARLES LILLIE,
WM. H. CROUT, Jr.